Z. C. SEEDERS.
SPRING MOTOR.
APPLICATION FILED JULY 28, 1908.
969,201.
Patented Sept. 6, 1910.
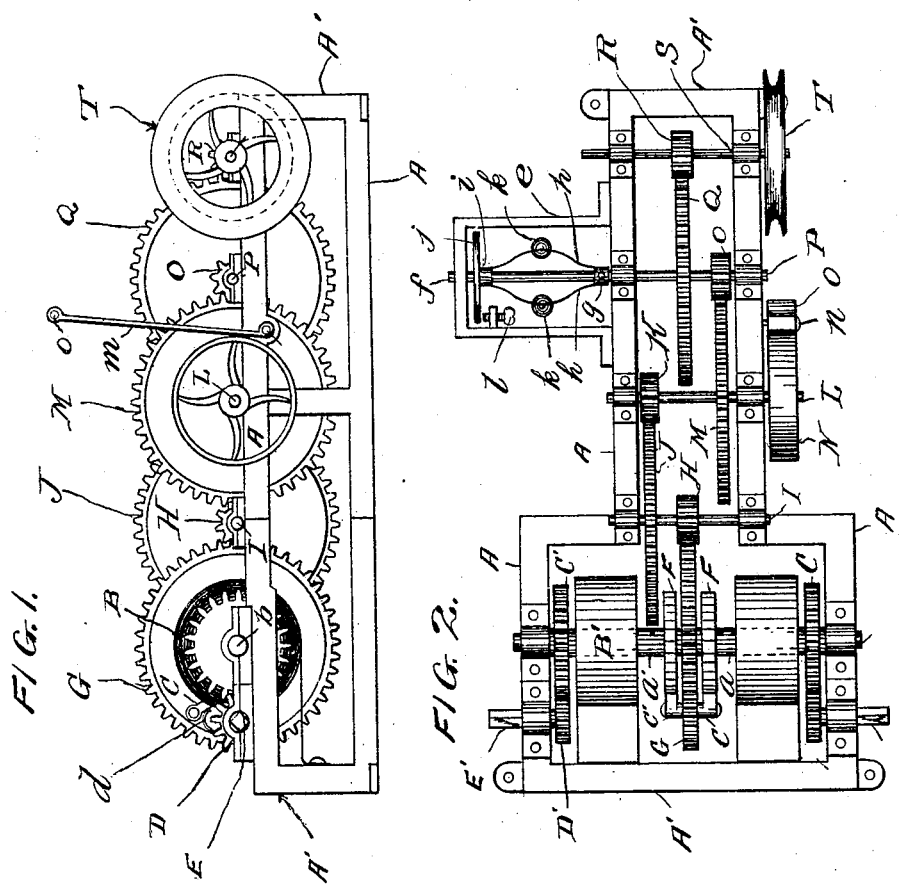
Witnesses
W. L. Brown,
F. M. White.
Inventor
Z. C. Seeders
By
J. P. Dederick
Attorney

UNITED STATES PATENT OFFICE.

ZEPHANIAH C. SEEDERS, OF PILOT POINT, TEXAS.

SPRING-MOTOR.

969,201.  Specification of Letters Patent.  Patented Sept. 6, 1910.

Application filed July 28, 1908. Serial No. 445,831.

*To all whom it may concern:*

Be it known that I, ZEPHANIAH C. SEEDERS, residing at Pilot Point, in the county of Denton and State of Texas, have invented certain new and useful Improvements in Spring-Motors, of which the following is a full, clear, and exact description, reference being had to the accompanying drawings, forming a part hereof.

This invention relates especially to improvements in motors operated by one or more springs, and may be employed for the purpose of driving rotary fans, sewing machines, and other light work; also by increasing the strength and number of the springs it may be used for many other purposes.

In the drawings illustrative of the invention, in which corresponding parts are denoted by like designating characters, Figure 1, is a side elevation, the machine being stood on end, and Fig. 2 is a plan view of the device complete.

In the said drawings, A designates the frame work which supports the train or gearing of the motor, the said frame work consisting of two sides, each of which is preferably of skeleton or open form and approximately of rectangular shape; and the said side portions are connected together by suitable end portions A'. Upon the framework, near one end is mounted the winding sleeves $a$ $a'$ upon which the driving springs B B' are respectively wound. These sleeves $a$ $a'$ turn loosely on a main shaft $b$ and carry gear wheels C C' the teeth of which mesh with gear pinions D D' upon winding shafts E E', which are provided with a squared portion that projects outward from the sides of frame A a suitable distance to receive a crank, by which the springs B B' may be independently and easily wound. The winding sleeves $a$ $a'$ also carry the usual ratchet-wheels F F', the teeth of which are engaged by pawls $c$ $c'$ carried by the gear wheel G, and said pawls are held in engagement with the teeth of the ratchet wheels F F' by springs $d$ also carried by the gear wheel G. This pawl and ratchet mechanism serves to prevent the wrongful unwinding of the main springs B B' and permits said springs to be wound without turning the gearing, thus insuring the expenditure of the power derived from the springs through the train of gearing. The teeth of gear wheel G mesh with a gear-pinion H upon a shaft I located at the intersection of the frame with the extensions formed thereon and having its bearings in the frame. The shaft I also carries a gear-wheel J, the teeth of which mesh with those of a gear pinion K on a shaft L, this shaft carries a gear wheel M and a brake wheel N. The teeth of gear wheel M mesh with a gear-pinion O upon a shaft P that carries a gear wheel Q and a governor, which will be referred to more specifically hereafter. The teeth of gear wheel Q mesh with a pinion R carried by shaft S, and to the outer end of said shaft S is attached a sheave wheel T through which, by means of a belt, power is communicated to the mechanism to be driven.

Secured to the frame A, and projecting laterally therefrom, is a bracket $e$ in which the projecting end of shaft P is journaled at $f$; to this shaft a collar $g$ is secured, and to the collar, at opposite sides are attached flat springs $h$ that extend to the hub $i$ of disk $j$, to which hub the opposite ends of the springs are secured. This hub and disk fit the shaft P loosely and slides freely on said shaft; centrally between the ends of each of the springs $h$ are secured weights $k$, and when the shaft P is revolved rapidly the weights are thrown outward by centrifugal force, causing the disk $j$ to contact with thumb-screw $l$ which checks the speed to any predetermined number of revolutions. The brake lever $m$ is pivoted to the outside of frame A at $n$; it extends upwardly, terminating in an eye $o$ in which a cord may be fastened for convenience in applying the brake and stopping the motor in cases where the motor is secured in an elevated position.

It will be seen from the foregoing description that the motor is simple, compact, and inexpensive of construction, but while the mechanism shown is an approved one I do not wish to be limited thereto, as minor changes may be made therein without departing from the principle of this invention or sacrificing any of its advantages. It is obvious, therefore, that the parts may be increased or decreased in size to correspondingly increase or decrease the power of the motor, and the right is reserved to the use of the device for any purpose for which it is adapted.

Having thus described my invention, what I claim as new therein, and desire to secure by Letters Patent, is—

A spring motor, consisting of a rectangular frame, studs mounted in the frame and having ends adapted to receive a winding crank, pinions on the inner ends of the studs, a shaft journaled in the frame, sleeves mounted on the shaft, gear wheels carried by the sleeves in mesh with the said pinions, springs having one end connected to the frame and the other to one of the sleeves and adapted to be wound on the sleeves, ratchet wheels on the inner ends of the sleeves, a gear wheel on the shaft between said ratchet wheels, pawls carried by the gear wheel for engaging the ratchet wheels, a series of shafts bearing gear and pinion wheels mounted in the frame, the main gear wheel being in mesh with the first pinion and the gear wheel on each shaft being in mesh with the pinion of the succeeding shaft, a speed governor and a brake carried by extensions of certain of the shafts, and a shaft bearing a sheave and having a pinion in mesh with the final gear wheel.

In testimony whereof I affix my signature in presence of two witnesses.

ZEPHANIAH C. SEEDERS.

Witnesses:
W. L. BROWN,
F. M. WHITE.